US007613694B2

(12) United States Patent
Omholt

(10) Patent No.: US 7,613,694 B2
(45) Date of Patent: Nov. 3, 2009

(54) COMPUTER-IMPLEMENTED METHOD AND APPARATUS FOR RECORDING AND ORGANIZING MULTIPLE RESPONSES TO QUERIES USED TO CREATE A LEGACY PROFILE IN A MANNER THAT EXPANDS MEMORY RECALL

(76) Inventor: Ray E. Omholt, 668 Kadar Dr., West Chester, PA (US) 19382

( * ) Notice: Subject to any disclaimer, the term of this patent is extended or adjusted under 35 U.S.C. 154(b) by 0 days.

(21) Appl. No.: 11/844,552

(22) Filed: Aug. 24, 2007

(65) Prior Publication Data

US 2007/0291909 A1 Dec. 20, 2007

(51) Int. Cl.
*G06F 17/30* (2006.01)
*G06F 7/00* (2006.01)
(52) U.S. Cl. .............................. 707/3; 707/10; 707/102
(58) Field of Classification Search ........................ None
See application file for complete search history.

(56) References Cited

U.S. PATENT DOCUMENTS

| | | | | |
|---|---|---|---|---|
| 3,775,864 | A * | 12/1973 | Bisinger et al. | 434/325 |
| 5,822,743 | A * | 10/1998 | Gupta et al. | 706/50 |
| 6,169,986 | B1 * | 1/2001 | Bowman et al. | 707/5 |
| 6,377,944 | B1 | 4/2002 | Busey et al. | |
| 6,912,532 | B2 * | 6/2005 | Andersen | 707/10 |
| 7,120,615 | B2 * | 10/2006 | Sullivan et al. | 706/15 |
| 2004/0030697 | A1 * | 2/2004 | Cochran et al. | 707/9 |
| 2005/0085875 | A1 * | 4/2005 | Van Zuylen | 607/88 |
| 2005/0154716 | A1 * | 7/2005 | Watson et al. | 707/3 |
| 2005/0187929 | A1 * | 8/2005 | Staggs | 707/4 |
| 2006/0116996 | A1 * | 6/2006 | Brill et al. | 707/3 |

OTHER PUBLICATIONS

SuperKey version 1.0 Owner's Handbook, Borland International, Inc. copyright ©1985, 218 pages.

* cited by examiner

*Primary Examiner*—Baoquoc N To
(74) *Attorney, Agent, or Firm*—Panitch Schwarbe Belisario & Nadel LLP

(57) ABSTRACT

Focused sets of queries are presented to an interviewee. Responses to the queries are recorded and displayed to the interviewee in a manner that focuses the interviewee on the current query. Responses are sorted based on importance to the interviewee. Responses are confirmed by the interviewee to ensure completeness and accuracy.

18 Claims, 6 Drawing Sheets

COMPUTER-IMPLEMENTED METHOD AND APPARATUS FOR RECORDING AND ORGANIZING MULTIPLE RESPONSES TO QUERIES USED TO CREATE A LEGACY PROFILE IN A MANNER THAT EXPANDS MEMORY RECALL

COPYRIGHT NOTICE AND AUTHORIZATION

Portions of the documentation in this patent document contain material that is subject to copyright protection. The copyright owner has no object to the facsimile reproduction by anyone of the patent document or the patent disclosure as it appears in the Patent and Trademark Office file or records, but otherwise reserves all copyright rights whatsoever.

BACKGROUND OF THE INVENTION

Many different interviewing techniques exist today to obtain information from a person. In a typical interview wherein query responses are recorded, such as at a deposition or court hearing, the person is given a query, either written or oral, and the person's response is then recorded in a linear manner. Thus, if multiple responses are given to the query, the responses are recorded one right after each other. In order to elicit the highest quality responses to queries and to make the best use of responses, new interviewing techniques need to be developed. The present invention fulfills such a need.

BRIEF DESCRIPTION OF THE DRAWINGS

The foregoing summary as well as the following detailed description of preferred embodiments of the invention, will be better understood when read in conjunction with the appended drawings. For the purpose of illustrating the invention, the drawings show presently preferred embodiments. However, the invention is not limited to the precise arrangements and instrumentalities shown. In the drawings.

BRIEF SUMMARY OF THE INVENTION

Figure 1:
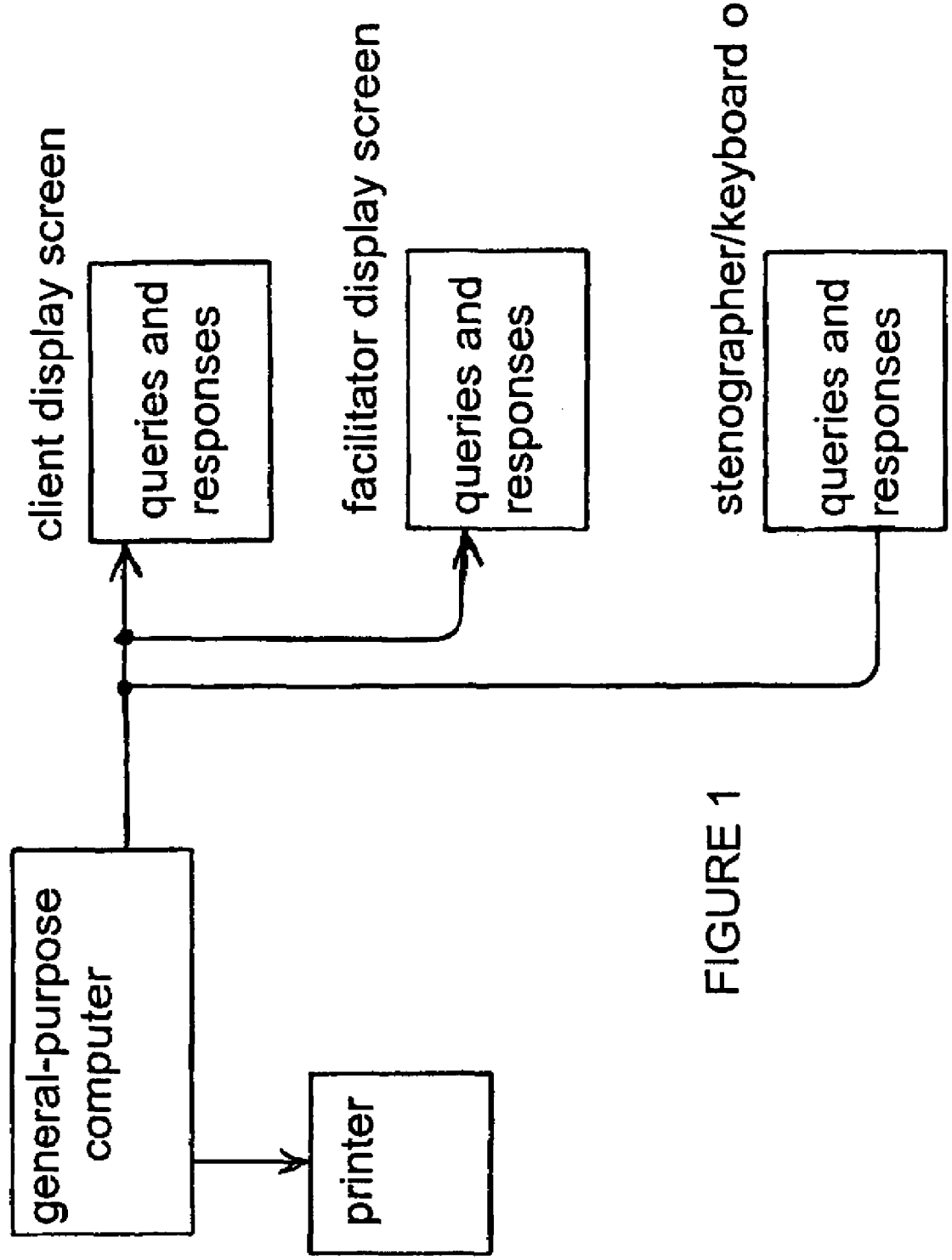
FIG. 1 shows a schematic block diagram of a hardware configuration for implementing one preferred embodiment of the present invention.

Focused sets of queries are presented to an interviewee. Responses to the queries are recorded and displayed to the interviewee in a manner that focuses the interviewee on the current query. Responses are sorted based on importance to the interviewee. Responses are confirmed by the interviewee to ensure completeness and accuracy.

DETAILED DESCRIPTION OF THE INVENTION

Certain terminology is used herein for convenience only and is not to be taken as a limitation on the present invention.

The present invention is described in the context of a service called Legacy Profiles™ commercialized by Legacy Profiles, Inc., West Chester, Pa. (World Wide Web.legacyprofiles.com). Legacy Profiles utilizes a memory-by-association process which helps interviewees recall positive and happy life memories. In the process, certified facilitators use software to conduct a series of face-to-face, interviews with the clients. These memories spanning a lifetime are preserved in a Legacy Book created for each client. The present invention is used in conjunction with the software-driven interviewing process for creating the content of the Legacy Book.

I. Overview of System

In one preferred embodiment of the present invention, a person is presented with a series of queries, and multiple responses are recorded for at least some of the queries. The "person" is also referred to interchangeably as an "interviewee," "client," or "subject." The process operates as follows:

1. A query is presented to a person on a first location of a display screen. The "query" is also referred to interchangeably as a "question," "inquiry," or "question line."
2. A first response to the query is recorded and then displayed in a second location of the display screen. The second location of the display screen is directly below the first location.
3. The first response to the query is moved to a third location of the display screen. The third location of the display screen is below the second location.
4. The second response to the query is then recorded and displayed in the second location of the display screen.
5. If one or more subsequent responses to the query are given, at least some of the previously given responses to the query are moved to locations on the display screen that are below the second location.
6. The one or more subsequent responses to the query are then recorded and each successive subsequent response is displayed in the second location of the display screen.

In another preferred embodiment of the present invention, the most recent response is always displayed in a location "adjacent to" the location of the query, such as to the immediate right of the query. Other adjacent locations are within the scope of the invention, such as directly above, or to the immediate left of the query.

In another preferred embodiment of the present invention, a query is presented to a person on a first location of a display screen and multiple responses to the query are recorded. The current response is displayed on the display screen in a second location of the display screen which is adjacent to, such as directly below, the first location. One or more previously given responses are displayed on the display screen in locations that are not adjacent to the first location, such as below the second location.

In another preferred embodiment of the present invention, multiple responses to a query presented to a person are recorded and prioritized as follows:

1. A query is presented to a person on a first location of a display screen.
2. Multiple responses to the query are recorded and then displayed on the display screen below the first location.
3. A predetermined number of the "strongest" responses to the query are identified. The "strongest" response may be the most important response, or the most relevant response. To assist in identifying the strongest responses, a document may be printed out that shows the multiple responses below the query. The printed document may then be used to display and help identify the predetermined number of the strongest responses to the query. Alternatively, the person may simply refer to the display screen to indicate the strongest responses. In one preferred scheme, there are only one, two or three "strongest" responses.
4. The multiple responses are prioritized and sorted in accordance with the identified strongest responses and then redisplayed on the display screen by displaying the identified strongest responses directly below the first location, and displaying the remaining responses below the strongest responses, preferably in descending order of importance to the interviewee.

5. A predetermined number of the next strongest responses to the query are then identified from the responses not identified as being the strongest responses.

6. The multiple responses are then reprioritized and resorted in accordance with the identified strongest and next strongest responses. The multiple responses are then redisplayed on the display screen by displaying the identified strongest responses directly below the first location, displaying the identified next most strong responses below the strongest responses, and displaying the remaining responses below the next most strong responses.

II. Detailed Disclosure

Appendix A is an exemplary "topics menu" for a series of query sessions in the topics menu.

Appendix B is a sample query session for Topic 11. Appendix B includes 21 demonstration (demo) pages that illustrate the mechanics of an exemplary query session in a step-by-step process. The demo pages appear on a display screen that is visible to the interviewee during the query process. At any point in time, the current demo page may also be printed for closer inspection and markup by the interviewee, such as during a prioritization stage or editing stage. The printed pages preferably have time and date stamps (not shown in the Appendix B pages.) The following explanation is provided of the demo pages.

A. HEADER INFO: This typical page top or "header" shows 1) the date and time to the minute on which this file was last edited and saved (shown only on Demo Page 1 in this example, but it would appear on all headers), 2) the name of the client or subject (hereafter, referred to as the "subject"), 3) the Topic number selected by the subject from our Topics Menu), and 4) the demonstration page number running from Demo Page #1 to Demo Page #21. Note that Demo Pages #20 and #21 are two pages in length each.

B. GENERAL TOPIC: The topic from the Topics Menu selected for this demo printout is Topic #11, "Happy Memories of Family Life". Many Topics (including this one) are broken down into age-stages such as 1) Child, ages 6-12, 2) Teenager, ages 13-19, 3) Young Adult, ages 20-35, 4) Mature Adult, ages 36-55, and 5) Philosophical Years, age 56 and older.

C. DEMO AGE RANGE: The age range selected for this demo is the first of the five standard age-ranges entitled "The Importance of My Family To Me As A Child—6 to 12", and this language appears as the first line in the operational database (the Question Line). No matter how many answers the subject gives to this question, their most current answer will always appear immediately under this question, with previous answers appearing under the most current answer with the next most recent answer appearing immediately under the most current answer, etc.

D. Demonstration Pages

1. DEMO PAGE #1: This is a printout of a blank header file. It is missing the subject's name and the Topic number selected by the subject.

2. DEMO PAGE #2: In this page, the subject's name has been filled in and the Topic number selected by the subject ("11") has also been filled in by the keyboard operator.

1. QUESTION LINE: The first of the database line under Topic 11 is the standard opening Question Line for Topic 11, "The Importance Of My Family to Me As A Child"—6 to 12". The primary sorting number for the lead Question Line is 11-1 as shown in the left margin.

2. DATA LINE: Immediately below the Question Line on this page, the first data-entry line appears. The primary sorting number for this sub-Question Line entry is 11-1 dot followed by an indent followed by the entry 4x: followed by a second indent. It is at the right end of this second indent that the keyboard operator enters the first memory sentence(s) in his first response to the Question Line above.

3. DEMO PAGE 3: In this page, the subject has been asked to look at the Question Line and to read it out loud to activate both his visual and oral receptors and trigger his memory. The keyboard operator then enters the subject's first memory sentence(s) in response to the Question Line. This entry starts immediately to the right of the 4x:indent location in the line immediately below the Question Line. Multiple sentences will wrap.

4. DEMO PAGE 4: Following the entry discussed in Demo Page 3 above, the keyboard operator activates the "next entry" macro from anywhere within response #1 by striking the "+" key located on the far right edge of the keyboard. The macro moves the subject's response #1 down to two lines below the Question Line and simultaneously inserts a new blank "4x:indent" line immediately above the subject's response #1 and immediately below the Question Line.

5. DEMO PAGE 5: The subject has again been asked to look at the Question Line and to read it out loud. The blank 4x:indent line for his next response is located just under the Question Line. The subject can now also see his last response(s) immediately below the new blank entry line, and this refreshes his memory. The subject's response #2 to the Question Line is then entered following the procedure discussed in the Demo Page 3 section above.

6. DEMO PAGE 6: After the subject's response #2 has been entered, the keyboard operator repeats the actions taken in the Demo Page 4 section above and creates a new blank "4x:indent" line immediately above response #2 and immediately below the Question Line.

7. DEMO PAGE 7: The steps shown in the Demo Page 5 section above are repeated, and the subject's response #3 is then entered on the line immediately under the Question Line after the 4x:indent location.

8. DEMO PAGE 8: After the subject's response #3 has been entered, the keyboard operator repeats the actions taken in the Demo Page 4 section above and creates a new blank "4x:indent" line immediately above response #3 and immediately below the Question Line.

9. DEMO PAGE 9: The steps shown in the Demo Page 5 section above are repeated, and the subject's response #4 is then entered on the line immediately under the Question Line after the 4x:indent location.

10. DEMO PAGE 10: After the subject's response #4 has been entered, the keyboard operator repeats the actions taken in the Demo Page 4 section above and creates a new blank "4x:indent" line immediately above response #3 and immediately below the Question Line.

11. DEMO PAGE 11: The steps shown in the Demo Page 5 section above are repeated, and the subject's response #5 is then entered on the line immediately under the Question Line after the 4x:indent location 12. DEMO PAGE 12: After the subject's response #5 has been entered, the keyboard operator repeats the actions taken in the Demo Page 4 section above and creates a new blank "4x:indent" line immediately above response #3 and immediately below the Question Line.
13. DEMO PAGE 13: The steps shown in the Demo Page 5 section are repeated, and the subject's sixth and final response to the Question Line is then entered in the database on the line immediately under the Question Line after the 4x:indent location. Demo page 13 shows all six responses from the subject to the Question Line with the most current response appearing just under the Question Line and the oldest response appearing at the bottom of the page.
14. DEMO PAGE 14: In Demo Page 14, the subject has been given a printout of Demo Page 13 and been asked to carefully study the printout in order to select the three most important responses to him in their proper 1-2-3 order. The keyboard operator codes them with the numbers 1x, 2x, and 3x as shown (in place of the original 4x codes). Responses not included in the top three continue to have priority codes of "4x". The "x" is replaced with a letter (such as "4a", "4b", and "4c") to indicate the descending relative importance of these responses to the subject.
15. DEMO PAGE 15: Demo page 15 is a sorted version of Demo Page 14. Sort #1 is on the left margin column, and sort #2 is on the second (priority marked) column. The responses are now arranged in their proper order of importance to the subject. Seeing the sorted page, the subject may well elect to adjust the priority order of his responses. This can easily be done following the procedures discussed in Demo Page 14 above. If the subject has additional memories based on reading Demo Page 15, the keyboard operator can insert new blank lines by moving the cursor up to the top response and again taking the far-right "+" key.
16. DEMO PAGE 16: Demo page 16 illustrate the appearance of Demo Page 15 after "z"s have been entered at the left margin (by tapping the upper right-hand min key) in preparation for sorting all completed responses to the bottom of the database.
17. DEMO PAGE 17: Demo Page 17 shows the appearance of the database after sorting the file (control+corner min key). The Topic grouping 11-1 has been filed to the bottom of the database, and the next age-stage Question Line (Topic 11-2) appears at the top of the file, directly under the header. The Question Line, "The Importance of My Family To Me As An Adolescent—13 to 19" appears with a blank first-memory line (11-2 dot indent4x:indent) just under the Question Line. Please note that the sorting code numbers for this Topic and this age-stage are now 11-2 instead of 11-1. At this stage, the entire process begins again.
18. DEMO PAGE 18: Demo Page 18 is a completed and finally sorted version of all the memory responses generated by this subject with reference to the Topic 11-2, "The Importance of My Family To Me As An Adolescent—13 to 19". These family-related memory responses were generated utilizing the same processes described in Demo Pages 1 through 17.
19. DEMO PAGE 19: Demo page 19 is a completed and finally sorted version of all the memory responses generated by this subject with reference to the Topic 11-3, "The Importance of My Birth Family To Me As A Young Adult—20-35". These family-related memory responses were generated utilizing the same processes described in Demo Pages 1 through 17.
20. DEMO PAGES 20: Demo page 20 is a completed and finally sorted version of all the memory responses generated by this subject with reference to the Topic 11-4, "The Importance of My Own Family To Me As A Young Adult—20-35". These family-related memory responses were generated utilizing the same processes described in Demo Pages 1 through 17. Note that the subject's sentences per memory response are expanding versus his prior Demo Pages as he continues further into the memory recall process.
21. DEMO PAGE 21: Demo page 21 is a completed and finally sorted version of all the memory responses generated by this subject with reference to custom Topic 11-5, "The Importance of My Wife and Children to Me As the Girls Grew Up". These family-related memory responses were generated utilizing the same processes described in Demo Pages 1 through 17. Note that the subject's sentences per memory response continue to expand versus Demo Page 20.

Any suitable programming techniques may be used to manage the presentation of the demo page material so that they function in the manner shown in the demo pages. Presentation features include placement of the most current answers directly below the query, sorting of answers based on a client's most important answers, and the like. One preferred embodiment of the present invention illustrated herein uses word processing software in conjunction with a PC keyboard macro processor. However, the scope of the invention is not limited to this technique. One suitable combination of a word processor and a macro processor is WordPerfect 5.0 for DOS used in conjunction with SuperKey version 1.16A or 1.0. SuperKey lets users create keyboard macros. SuperKey was previously commercially available from Borland Software Corporation. The software associated with the word processor and the macro processor may be executed on any suitable general-purpose computer, such as a personal computer running a Windows or Mac operating system and MS-DOS.

FIG. 1 is a schematic block diagram of a hardware configuration for implementing one preferred embodiment of the present invention. Preferably, the client (interviewee) and the facilitator (interviewer) have duplicate display screens placed in front of them. If a stenographer (keyboard operator), as opposed to the facilitator, is present to record the client's responses, the stenographer would preferably also have a separate duplicate display screen. Alternatively, there may be one projected display screen that is visible to the client, facilitator, and optional stenographer. Having a display screen immediately in front of the client serves as a constant reminder of the exact wording of the current query. The facilitator may also read the query aloud to increase the effectiveness of the question for those who primarily gain information audibly, rather than from reading. Likewise, having one display screen of the client's immediately preceding responses to the current query visible on the display screen is helpful to the client in generating new memories.

In one preferred embodiment of the present invention, all of the parties are in the same physical location. In alternative embodiments, one or more of the parties are in locations remote from each other and are in live audio and/or audio-visual communication with each other via an electronic network, such as the Internet. For example, the client and the facilitator may communicate via webcams. If the stenographer is a different individual than the facilitator, the stenographer may be located remotely from both the client and the facilitator and needs to have only an audio communication with the client and the facilitator.

Figure 2:
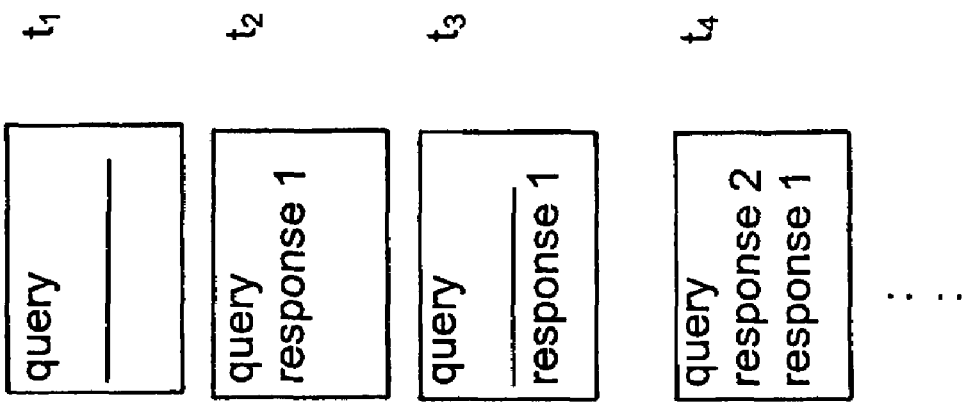
FIGS. 2-4 show different display configurations for queries and responses in accordance with preferred embodiments of the present invention.
Figure 3:
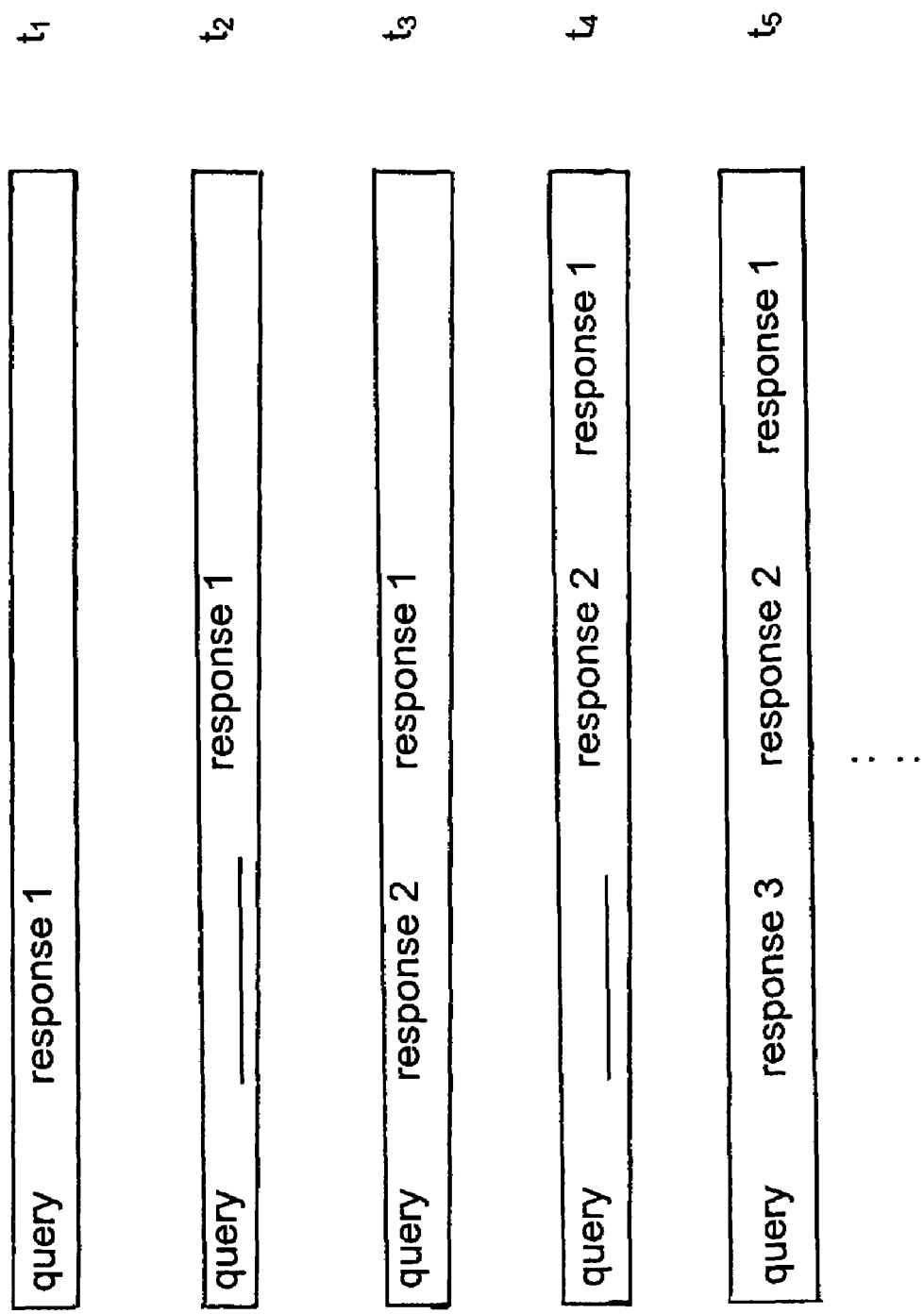
Figure 4:
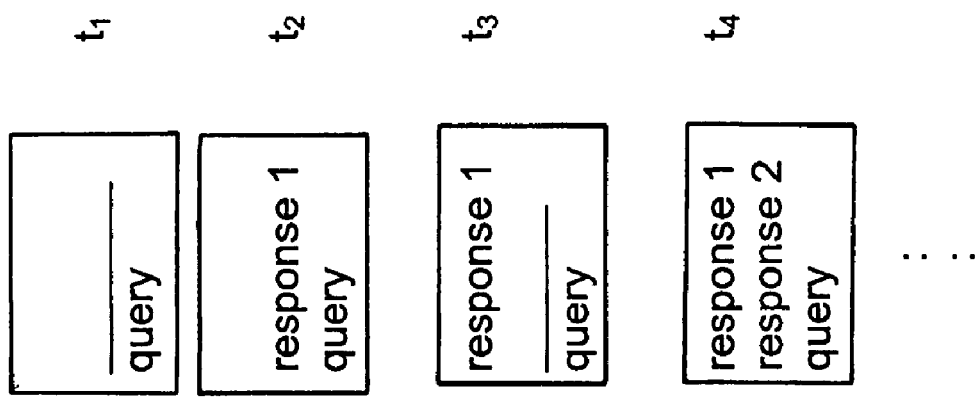

FIGS. 2-4 show different display configurations for queries and adjacent responses in preferred embodiments of the present invention. The Appendix B demo pages show responses that appear below queries, similar to FIG. 2. FIG. 3 shows responses that appear to the right of the query. FIG. 4 shows responses that appear above the query. In all instances, the current response appears adjacent to the query. This serves as a constant reminder to both the client and the facilitator as to the current query being addressed, and allows the client to be always looking at the query while the response is being entered, regardless of the number or length of previous responses that may have been given. This technique dramatically improves the quality of the responses. Also, placing the prior response immediately below the current response, thereby sandwiching the current response between the query and the previous response, helps to trigger additional memory-related responses from the client. This further improves the quality of the responses.

To maximize the client's ability to trigger additional memory-related responses while reviewing the display screen, it is preferable to provide the query and previous responses in a large font, and with a significant amount of spacing therebetween. This may cause some of the previous responses to appear off the display screen even though they still exist in the display screen buffer and are viewable by a normal scrolling action. The disclosure herein of displaying response(s) on a display screen includes scenarios wherein some of the response(s) are not visible at all times, but are present in the current display screen buffer.

In the preferred embodiment, a live facilitator interacts with the interviewee, either in the same physical location or in a remote location. In an alternative embodiment, the live facilitator may be replaced by a simulated person, chatterbot, or other type of artificial intelligence-driven entity that interacts with the interviewee. The responses may be entered by the interviewee, or by the simulated person or agent via a speech-to-text interface, or by a live stenographer/keyboard operator, if one exists. If the responses are entered by the interviewee, additional instructions and prompting may be used to ensure that the interviewee follows the same procedures that would occur as if a live facilitator presented the queries and entered the responses. The replacement of the live facilitator with an artificial intelligence entity provides the advantage of expanding the benefits of the present invention to more people, due to the reduced personnel costs.

Figure 5:
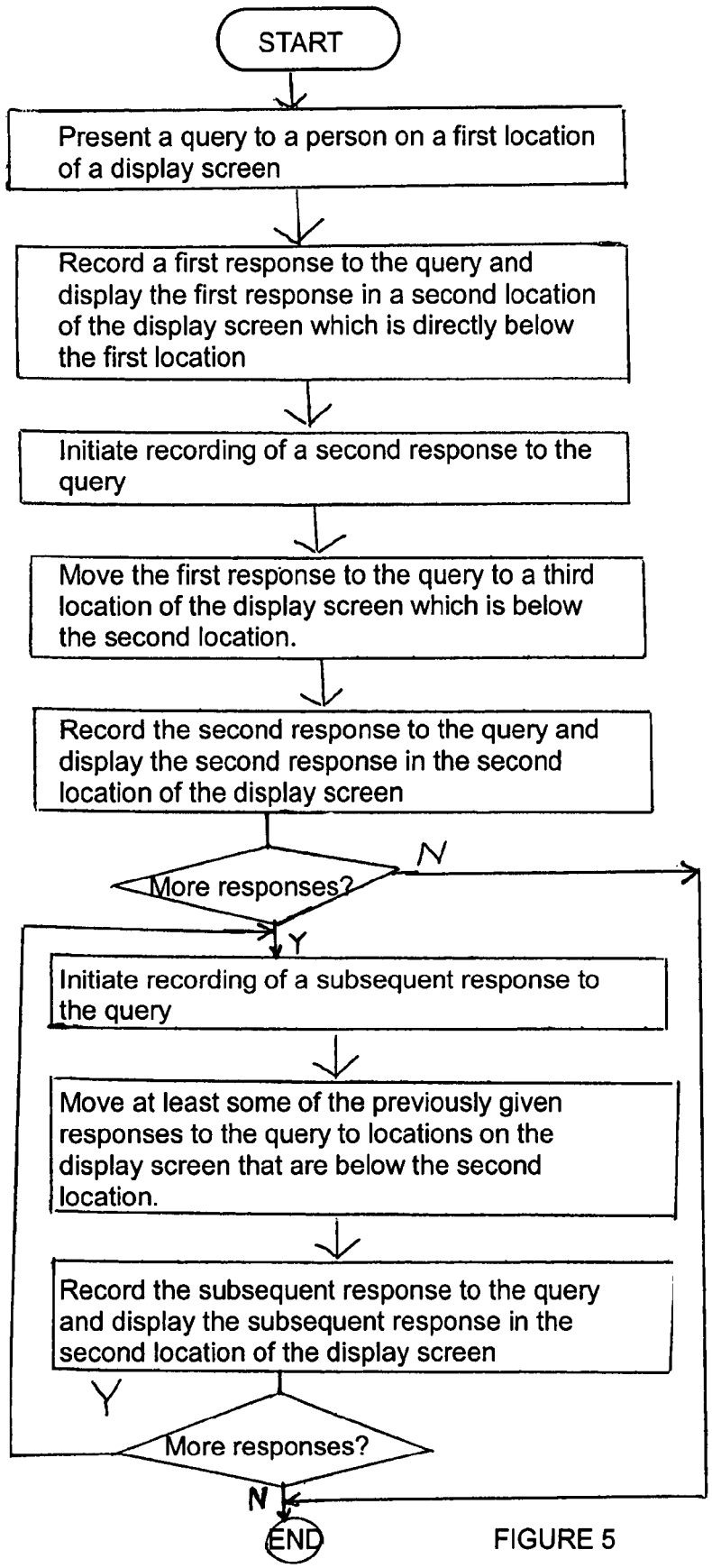
FIGS. 5 and 6 are flowcharts in accordance with preferred embodiments of the present invention.
Figure 6:
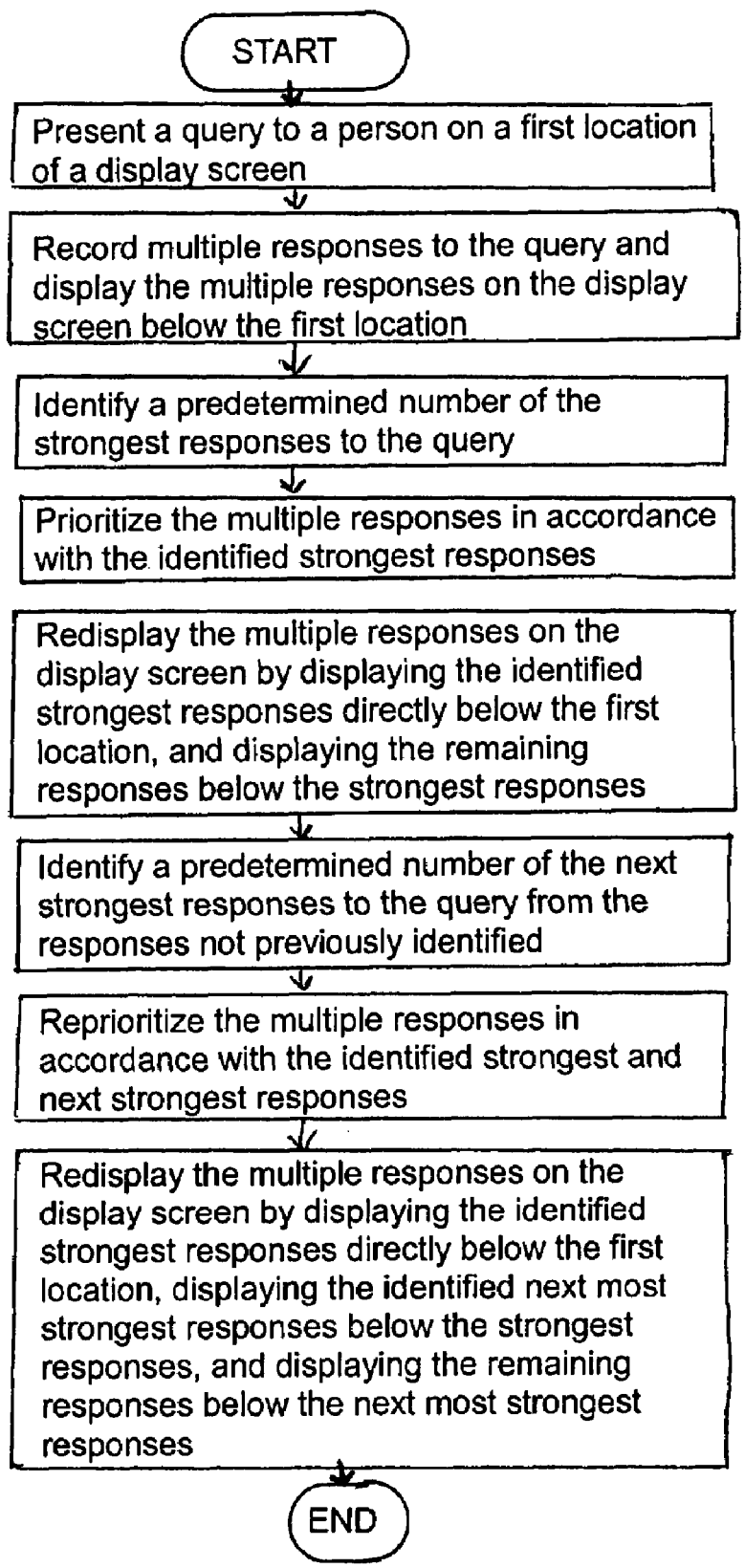

FIGS. 5 and 6 are self-explanatory flowcharts of process steps in accordance with preferred embodiments of the present invention.

Appendix C is a printout of a SuperKey macro program called LL.mac that may be used with the present invention. Appendix D is a printout of the operator keyboard instructions for running the LL.mac program.

The present invention has been described in the context of a service called Legacy Profiles which helps interviewees recall positive and happy life memories. However, the present invention may also be used for any interviewing process in which eliciting responses and prioritizing of responses is important, such as in professional psychological services where the queries are not limited to positive and happy memories.

The present invention may be implemented with any combination of hardware and software. If implemented as a computer-implemented apparatus, the present invention is implemented using means for performing all of the steps and functions described above.

The present invention can be included in an article of manufacture (e.g., one or more computer program products) having, for instance, computer useable media. The media has encoded therein, for instance, computer readable program code means for providing and facilitating the mechanisms of the present invention. The article of manufacture can be included as part of a computer system or sold separately.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A computer-implemented method of recording multiple human memory-elicited responses to a query presented to a person, the method comprising the steps of:
   (a) presenting a query to a person on a first location of a display screen during a query session;
   (b) recording a first response to the query and displaying the first response in a second location of the display screen, wherein the second location of the display screen is directly below the first location;
   (c) moving the first response to the query to a third location of the display screen, wherein the third location of the display screen is below the second location;
   (d) recording a second response to the query and displaying the second response in the second location of the display screen, wherein the responses are provided by the person to whom the query is presented, and the first and second query responses are recorded in the same query session;
   (e) moving at least some of the previously given responses to the query to locations on the display screen that are below the second location if one or more subsequent responses to the query are given;
   (f) recording the one or more subsequent responses to the query and displaying each successive subsequent response in the second location of the display screen;
   (g) identifying a predetermined number of the most important or most relevant responses to the query as selected by the person; and
   (h) prioritizing and sorting the multiple responses in accordance with the identified most important or most relevant responses and redisplaying the multiple responses on the display screen by:
      (i) displaying the identified most important or most relevant responses directly below the first location, and
      (ii) displaying the remaining responses below the most important or most relevant responses.

2. The method of claim 1 further comprising the steps of:
   (i) identifying a predetermined number of the next most important or most relevant responses to the query from the responses not identified in step (c);
   (j) reprioritizing and resorting the multiple responses in accordance with the identified most important or most relevant and next most important or most relevant responses and redisplaying the multiple responses on the display screen by:
      (i) displaying the identified most important or most relevant responses directly below the first location,
      (ii) displaying the identified next most important or most relevant responses below the most important or most relevant responses, and
      (iii) displaying the remaining responses below the next most important or most relevant responses.

3. The method of claim 1 wherein the predetermined number is one, two or three.

4. The method of claim 1 wherein step (g) further comprises printing out a document that shows the multiple responses below the query and using the printed document to display and help the person identify the predetermined number of the most important or most relevant responses to the query.

5. A computer-implemented method of recording multiple human memory-elicited responses to a query presented to a person, the method comprising the steps of:
   (a) presenting a query to a person on a first location of a display screen during a query session;
   (b) recording a first response to the query and displaying the first response in a second location of the display screen, wherein the second location of the display screen is adjacent to the first location;
   (c) moving the first response to the query to a third location of the display screen, wherein the third location of the display screen is not adjacent to the first location;
   (d) recording a second response to the query and displaying the second response in the second location of the display screen, wherein the responses are provided by the person to whom the query is presented, and the first and second query responses are recorded in the same query session;
   (e) moving at least some of the previously given responses to the query to locations on the display screen that are not adjacent to the first location if one or more subsequent responses to the query are given;
   (f) recording the one or more subsequent responses to the query and displaying each successive subsequent response in the second location of the display screen;
   (g) identifying a predetermined number of the most important or most relevant responses to the query as selected by the person; and
   (h) prioritizing and sorting the multiple responses in accordance with the identified most important or most relevant responses and redisplaying the multiple responses on the display screen by:
      (i) displaying the identified most important or most relevant responses in the second location of the display screen, and
      (ii) displaying the remaining responses in locations that are not adjacent to the first location.

6. The method of claim 5 wherein the third location is adjacent to the second location and not adjacent to the first location.

7. A computer-implemented apparatus for recording multiple human memory-elicited responses to a query presented to a person, the apparatus comprising:
   (a) means for presenting a query to a person on a first location of a display screen during a query session;
   (b) means for recording a first response to the query and displaying the first response in a second location of the display screen, wherein the second location of the display screen is directly below the first location;
   (c) means for moving the first response to the query to a third location of the display screen, wherein the third location of the display screen is below the second location;
   (d) means for recording a second response to the query and displaying the second response in the second location of the display screen, wherein the responses are provided by the person to whom the query is presented, and the first and second query responses are recorded in the same query session;
   (e) means for moving at least some of the previously given responses to the query to locations on the display screen that are below the second location if one or more subsequent responses to the query are given;
   (f) means for recording the one or more subsequent responses to the query and displaying each successive subsequent response in the second location of the display screen;
   (g) means for identifying a predetermined number of the most important or most relevant responses to the query as selected by the person; and
   (h) means for prioritizing and sorting the multiple responses in accordance with the identified most important or most relevant responses and redisplaying the multiple responses on the display screen by:
      (i) displaying the identified most important or most relevant responses directly below the first location, and
      (ii) displaying the remaining responses below the most important or most relevant responses.

8. The apparatus of claim 7 further comprising:
   (i) means for identifying a predetermined number of the next most important or most relevant responses to the query from the responses not identified in step (c);
   (j) means for reprioritizing and resorting the multiple responses in accordance with the identified most important or most relevant and next most important or most relevant responses and redisplaying the multiple responses on the display screen by:
      (i) displaying the identified most important or most relevant responses directly below the first location,
      (ii) displaying the identified next most important or most relevant responses below the most important or most relevant responses, and
      (iii) displaying the remaining responses below the next most important or most relevant responses.

9. The apparatus of claim 7 wherein the predetermined number is one, two or three.

10. The apparatus of claim 7 wherein the means for identifying a predetermined number of the most important or most relevant responses to the query further comprises means for printing out a document that shows the multiple responses below the query, and means for using the printed document to display and help the person identify the predetermined number of the most important or most relevant responses to the query.

11. A computer-implemented apparatus for recording multiple human memory-elicited responses to a query presented to a person, the apparatus comprising:
   (a) means for presenting a query to a person on a first location of a display screen during a query session;
   (b) means for recording a first response to the query and displaying the first response in a second location of the display screen, wherein the second location of the display screen is adjacent to the first location;
   (c) means for moving the first response to the query to a third location of the display screen, wherein the third location of the display screen is not adjacent to the first location;
   (d) means for recording a second response to the query and displaying the second response in the second location of the display screen, wherein the responses are provided by the person to whom the query is presented, and the first and second query responses are recorded in the same query session;
   (e) means for moving at least some of the previously given responses to the query to locations on the display screen that are not adjacent to the first location if one or more subsequent responses to the query are given;

(f) means for recording the one or more subsequent responses to the query and displaying each successive subsequent response in the second location of the display screen;

(g) means for identifying a predetermined number of the most important or most relevant responses to the query as selected by the person; and (h) means for prioritizing and sorting the multiple responses in accordance with the identified most important or most relevant responses and redisplaying the multiple responses on the display screen by:
  (i) displaying the identified most important or most relevant responses in the second location of the display screen, and
  (ii) displaying the remaining responses in locations that are not adjacent to the first location.

12. The apparatus of claim 11 wherein the third location is Adjacent to the second location and not adjacent to the first location.

13. An article of manufacture for recording multiple human memory-elicited responses to a query presented to a person, the article of manufacture comprising computer-readable media encoded with computer-executable instructions for performing a method comprising the steps of:

(a) presenting a query to a person on a first location of a display screen during a query session;

(b) recording a first response to the query and displaying the first response in a second location of the display screen, wherein the second location of the display screen is directly below the first location;

(c) moving the first response to the query to a third location of the display screen, wherein the third location of the display screen is below the second location;

(d) recording a second response to the query and displaying the second response in the second location of the display screen, wherein the responses are provided by the person to whom the query is presented, and the first and second query responses are recorded in the same query session;

(e) moving at least some of the previously given responses to the query to locations on the display screen that are below the second location if one or more subsequent responses to the query are given;

(f) recording the one or more subsequent responses to the query and displaying each successive subsequent response in the second location of the display screen;

(g) identifying a predetermined number of the most important or most relevant responses to the query as selected by the person; and (h) prioritizing and sorting the multiple responses in accordance with the identified most important or most relevant responses and redisplaying the multiple responses on the display screen by:
  (i) displaying the identified most important or most relevant responses directly below the first location, and
  (ii) displaying the remaining responses below the most important or most relevant responses.

14. The article of manufacture of claim 13 wherein the computer-executable instructions perform a method further comprising the steps of:

(i) identifying a predetermined number of the next most important or most relevant responses to the query from the responses not identified in step (c);

(j) reprioritizing and resorting the multiple responses in accordance with the identified most important or most relevant and next most important or most relevant responses and redisplaying the multiple responses on the display screen by:
  (i) displaying the identified most important or most relevant responses directly below the first location,
  (ii) displaying the identified next most important or most relevant responses below the most important or most relevant responses, and
  (iii) displaying the remaining responses below the next most important or most relevant responses.

15. The article of manufacture of claim 13 wherein the predetermined number is one, two or three.

16. The article of manufacture of claim 13 wherein step (g) further comprises printing out a document that shows the multiple responses below the query and using the printed document to display and help the person identify the predetermined number of the most important or most relevant responses to the query.

17. An article of manufacture for recording multiple human memory-elicited responses to a query presented to a person, the article of manufacture comprising computer-readable media encoded with computer-executable instructions for performing a method comprising the steps of:

(a) presenting a query to a person on a first location of a display screen during a query session;

(b) recording a first response to the query and displaying the first response in a second location of the display screen, wherein the second location of the display screen is adjacent to the first location;

(c) moving the first response to the query to a third location of the display screen, wherein the third location of the display screen is not adjacent to the first location; and (d) recording a second response to the query and displaying the second response in the second location of the display screen, wherein the responses are provided by the person to whom the query is presented, and the first and second query responses are recorded in the same query session;

(e) moving at least some of the previously given responses to the query to locations on the display screen that are not adjacent to the first location if one or more subsequent responses to the query are given;

(f) recording the one or more subsequent responses to the query and displaying each successive subsequent response in the second location of the display screen;

(g) identifying a predetermined number of the most important or most relevant responses to the query as selected by the person; and (h) prioritizing and sorting the multiple responses in accordance with the identified most important or most relevant responses and redisplaying the multiple responses on the display screen by:
  (i) displaying the identified most important or most relevant responses in the second location of the display screen, and
  (ii) displaying the remaining responses in locations that are not adjacent to the first location.

18. The article of manufacture of claim 17 wherein the third location is adjacent to the second location and not adjacent to the first location.

\* \* \* \* \*